United States Patent
Yoshimura

(10) Patent No.: US 9,798,316 B2
(45) Date of Patent: Oct. 24, 2017

(54) MOTION CONTROLLER CAPABLE OF SPECIFYING PROGRAM EXECUTION PACE

(71) Applicant: FANUC Corporation, Yamanashi (JP)

(72) Inventor: Ryouta Yoshimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 723 days.

(21) Appl. No.: 14/321,953

(22) Filed: Jul. 2, 2014

(65) Prior Publication Data

US 2015/0012120 A1 Jan. 8, 2015

(30) Foreign Application Priority Data

Jul. 3, 2013 (JP) .................................. 2013-140102

(51) Int. Cl.
| | | |
|---|---|---|
| G05B 19/19 | (2006.01) | |
| G05B 5/01 | (2006.01) | |
| G05B 11/42 | (2006.01) | |
| G05B 19/4155 | (2006.01) | |
| G05B 11/36 | (2006.01) | |

(52) U.S. Cl.
CPC .......... *G05B 19/4155* (2013.01); *G05B 11/36* (2013.01); *G05B 2219/34384* (2013.01); *G05B 2219/35386* (2013.01)

(58) Field of Classification Search
None
See application file for complete search history.

(56) References Cited

U.S. PATENT DOCUMENTS

| | | | |
|---|---|---|---|
| 2005/0034128 A1 | 2/2005 | Nagashima et al. | |
| 2005/0228533 A1* | 10/2005 | Hioki | G05B 19/4103 700/159 |
| 2008/0212224 A1* | 9/2008 | Evans | G11B 15/087 360/71 |
| 2012/0239978 A1* | 9/2012 | Narutani | G06F 11/3612 714/32 |
| 2014/0088734 A1* | 3/2014 | Narutani | G05B 19/05 700/28 |

(Continued)

FOREIGN PATENT DOCUMENTS

| | | |
|---|---|---|
| CN | 1061755 A | 6/1992 |
| DE | 10343809 A1 | 4/2004 |

(Continued)

OTHER PUBLICATIONS

Office Action in CN Application No. 201410315927.4, mailed Dec. 2, 2015.

(Continued)

*Primary Examiner* — Robert Fennema
*Assistant Examiner* — Jay Jung
(74) *Attorney, Agent, or Firm* — Hauptman & Ham, LLP

(57) ABSTRACT

A motion controller is provided which allows a program to be executed in a specified time. The program is executed, and the execution time of each of the blocks of the program and the execution time of the entire program are measured. Then, a predicted time until an in-position state is established is loaded. The execution time of the entire specified program is loaded. The execution time of each bock and a moving speed for each block are calculated, then a speed for each block is substituted with the calculated moving speed.

9 Claims, 13 Drawing Sheets

(56) References Cited

U.S. PATENT DOCUMENTS

2014/0214193 A1 7/2014 Tsuda et al.
2015/0134100 A1* 5/2015 Iuchi .................. G05B 19/4155
                                                    700/159

FOREIGN PATENT DOCUMENTS

| DE | 112011105627 T5 | 8/2014 |
| JP | 9-282019 A | 10/1997 |
| JP | 10-31509 A | 2/1998 |
| JP | 2007-234002 A | 9/2007 |
| WO | 2013/038543 A1 | 3/2013 |

OTHER PUBLICATIONS

Decision to Grant a Patent mailed Feb. 17, 2015, corresponding to Japanese patent application No. 2013-140102.
Office Action in DE Application No. 102014108964.2, dated May 30, 2017.

\* cited by examiner

FIG. 1
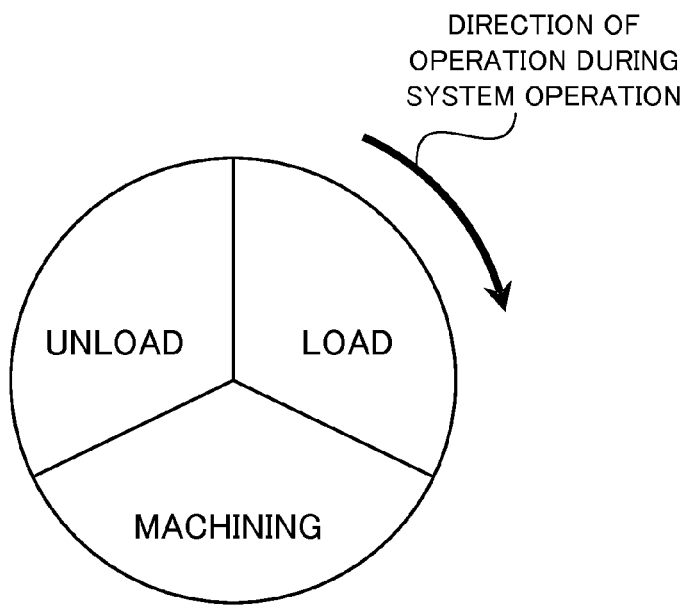
FIG. 2
| PROGRAM |
| --- |
| G00 X100.0 ; (SPEED IS 10000) |
| G01 X300.0 F2000 ; |
FIG. 3
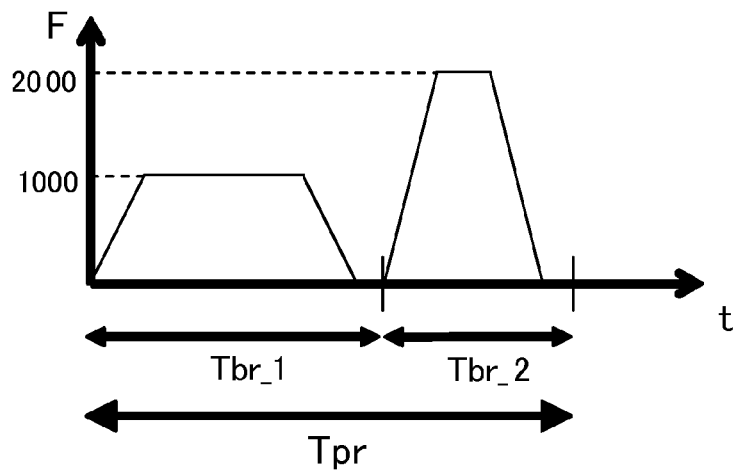

| PROGRAM |
| --- |
| G00 X100.0 ; (SPEED IS10000) |
| M20 ; |
| G01 X300.0 F2000 ; |
| M30 |

MOTION CONTROLLER CAPABLE OF SPECIFYING PROGRAM EXECUTION PACE

RELATED APPLICATIONS

The present application claims priority to Japanese Application Number 2013-140102, filed Jul. 3, 2013, the disclosure of which is hereby incorporated by reference herein in its entirety.

BACKGROUND OF THE INVENTION

1. Field of the Invention

The present invention relates to a motion controller capable of specifying a program execution pace.

2. Description of the Related Art

If an apparatus operating in cooperation with a peripheral device is controlled by a motion controller that sequentially executes a preregistered program including a plurality of blocks, the peripheral device may invade the movable range of the apparatus and the apparatus and the peripheral device may interfere with each other when the program fails to end in a given time. Thus, in the conventional art, the execution time of the entire program is preliminarily determined and the ratio between the execution time and a desired time is set to be an override value so that the program execution time is adjusted by varying the moving speeds of axes.

Now, operation of a system including a machining machine, a loader, and a motion controller will be described. As shown in FIG. 1, the system performs loading, machining, and unloading in order. An external conductor determines an execution pace for the whole system, and each apparatus operates in an assigned time to satisfy the execution pace. For example, when the conductor gives a command to set the pace of the whole system to be 50%, each apparatus performs its own operation at a pace of 50%.

In the machining machine, when the program is to be executed so as to satisfy the execution time specified by the conductor, in the conventional art, the ratio between the pre-measured execution time of the program and the specified time is set to be an override value, and the moving speeds of the axes are changed. However, if an element such as an in-position check or time fixed acceleration and deceleration is present for which the execution time is independent of overriding, the program execution time and the specified time may deviate from each other in spite of a set override time.

Japanese Patent Application Laid-open No. 2007-234002 discloses that, when a single block is included in a program, the program is executed in a specified time. However, this technique is not applied to a program with a plurality of blocks.

If a machining time is extended, a loader advancing for unloading and the machining machine may interfere with each other. To prevent such interference, the override value is conventionally set to a greater value to make the execution time of the program slightly shorter than the specified time. This allows interference to be avoided, but needs faster movement or acceleration than execution in the specified time. As a result, much power needs to be consumed.

SUMMARY OF THE INVENTION

With the problems of the conventional art in view, it is an object of the present invention to provide a motion controller that allows a program to be executed in a specified execution time even when the program includes an element such as an in-position check or time fixed acceleration and deceleration for which the execution time is independent of overriding.

According to the present invention, the following are preliminarily executed: measurement of an execution time elapsed when a program is executed under no control, setting of a desired execution time, and setting of a time immediately after completion of a pulse output for each block in the program until an in-position state is established. Then, a speed or an acceleration and deceleration time constant for each block which allows the program to be executed in the specified execution time is calculated based on the measured program execution time and the desired execution time, and the time needed to establish the set in-position state. The program is executed using the calculated speed or acceleration and deceleration time constant.

A first aspect of the motion controller according to the present invention is a motion controller that sequentially executes a preregistered program formed of a plurality of blocks. The motion controller includes: a block execution time measuring section that actually measures an execution time of each of the blocks constituting the program; a program execution time specifying section that specifies an execution time of the entire program; a positioning time setting section that sets a time immediately after a pulse output for the block is completed until an in-position state is established; a calculation section that calculates a speed or an acceleration and deceleration time constant for each block which allows the program to be executed in the program execution time specified by the program execution time specifying section, on the basis of the execution time of each block actually measured by the block execution time measuring section, the program execution time specified by the program execution time specifying section, and the time needed to establish the in-position state and set by the positioning time setting section; and an execution section that executes the program in use of the speed or the acceleration and deceleration time constant calculated by the calculation section.

A second aspect of the motion controller according to the present invention is a motion controller that sequentially executes a preregistered program formed of a plurality of blocks. The motion controller includes: a block execution time measuring section that actually measures an execution time of each of the blocks constituting the program; a program execution time specifying section that specifies an execution time of the entire program; a positioning time measuring section that actually measures a time immediately after a pulse output for the block is completed until an in-position state is established; a calculation section that calculates a speed or an acceleration and deceleration time constant for each block which allows the program to be executed in the program execution time specified by the program execution time specifying section, on the basis of the execution time of each block actually measured by the block execution time measuring section, the program execution time specified by the program execution time specifying section, and the time needed to establish the in-position state and actually measured by the positioning time measuring section; and an execution section that executes the program in use of the speed or the acceleration and deceleration time constant calculated by the calculation section.

The motion controller may further include an auxiliary function execution time setting section that sets a time needed to execute an auxiliary function. The calculation section may calculate the speed or the acceleration and deceleration time constant for each block which allows the program to be executed in the specified execution time also taking into account the execution time of the auxiliary function set by the auxiliary function execution time setting section.

The motion controller may further include an auxiliary function execution time measuring section that actually measures the time needed to execute the auxiliary function. The calculation section may calculate the speed or the acceleration and deceleration time constant for each block which allows the program to be executed in the specified execution time also taking into account the execution time of the auxiliary function actually measured by the auxiliary function execution time setting section.

A third aspect of the motion controller according to the present invention is a motion controller that sequentially executes a preregistered program formed of a plurality of blocks. The motion controller includes: a block execution time analyzing section that analyzes an execution time of each of the blocks constituting the program; a program execution time specifying section that specifies an execution time of the entire program; a positioning time setting section that sets a time immediately after a pulse output for the block is completed until an in-position state is established; a calculation section that calculates a speed or an acceleration and deceleration time constant for each block which allows the program to be executed in the program execution time specified by the program execution time specifying section, on the basis of the execution time of each block analyzed by the block execution time analyzing section, the program execution time specified by the program execution time specifying section, and the time needed to establish the in-position state and set by the positioning time setting section; and an execution section that executes the program in use of the speed or the acceleration and deceleration time constant calculated by the calculation section.

A fourth aspect of the motion controller according to the present invention is a motion controller that sequentially executes a preregistered program formed of a plurality of blocks. The motion controller includes: a block execution time measuring section that actually measures an execution time of each of the blocks constituting the program; a program execution pace ratio specifying section that specifies a ratio of an execution pace for the entire program; a positioning time setting section that sets a time immediately after a pulse output for the block is completed until an in-position state is established; a calculation section that calculates a speed or an acceleration and deceleration time constant for each block which allows the program to be executed at an program execution pace ratio specified by the program execution pace ratio specifying section, on the basis of the execution time of each block actually measured by the block execution time measuring section, the program execution pace ratio specified by the program execution pace ratio specifying section, and the time needed to establish the in-position state and set by the positioning time setting section; and an execution section that executes the program in use of the speed or the acceleration and deceleration time constant calculated by the calculation section.

A fifth aspect of the motion controller according to the present invention is a motion controller that simultaneously executes a plurality of preregistered programs formed of a plurality of blocks respectively. The motion controller includes: a block execution time measuring section that measures an execution time of each of the blocks constituting each of the programs; a specified program measuring section that actually measures an execution time of the whole of a program specified from among the plurality of programs; a program execution time specifying section that specifies an execution time of each program; a positioning time setting section that sets a time immediately after a pulse output for the block is completed until an in-position state is established; a calculation section that calculates a speed or an acceleration and deceleration time constant for each block which allows each program to be executed in the same program execution time as the execution time of the specified program, on the basis of the execution time of each program specified by the program execution time specifying section, the execution time of the whole of the specified program measured by the specified program measuring section, and the time needed to establish the in-position state and set by the positioning time setting section; and an execution section that simultaneously executes the plurality of programs in use of the speed or the acceleration and deceleration time constant calculated by the calculation section.

The motion controller may further include a block execution time measuring section that actually measures the execution time of each of the blocks constituting the program while the program is being executed, and a block speed/acceleration and deceleration time constant calculating section that calculates a speed or an acceleration and deceleration time constant to be executed next time on the basis of the block execution time actually measured by the block execution time measuring section. A target block is executed using the speed or the acceleration and deceleration time constant calculated by the block speed/acceleration and deceleration time constant calculating section, to change an execution pace for the entire program in such a manner that the execution pace corresponds to the execution time or ratio specified by the program.

The motion controller may further include a block acceleration analyzing section that analyzes an acceleration of each of the blocks included in the program, and a speed/acceleration and deceleration time constant calculating section that compares the accelerations of the blocks analyzed by the block acceleration analyzing section to calculate a speed or an acceleration and deceleration time constant in such a manner that the acceleration is reduced for a block with a high acceleration. The acceleration is reduced, in a concentrated manner, for a high acceleration part of the entire program to be executed, to change an execution pace for the entire program in such a manner that the execution pace corresponds to the execution time or ratio specified by the program.

The present invention allows the program to be executed in a desired time in spite of presence of an element such as an in-position check or time fixed acceleration and deceleration for which the execution time is independent of overriding. This reduces power consumption to a minimum needed amount.

BRIEF DESCRIPTION OF THE DRAWINGS

The above-described and other objects and features of the present invention will be apparent from the description of embodiments taken in conjunction with the attached drawings:

FIG. 1 is a diagram illustrating operation of a system including a machining machine, a loader, and a motion controller;

FIG. 2 is a diagram of an example of a program illustrating Embodiment 1 of the motion controller according to the present invention;

FIG. 3 is a diagram illustrating the relation between the execution time Tpr of the entire program and the execution times Tbr_1 and Tbr_2 of blocks (block 1 and block 2) providing a program;

DESCRIPTION OF THE PREFERRED EMBODIMENTS

Embodiment 1

By way of example, a motion controller will be described which stores a program shown in FIG. 2 in a memory for the motion controller and which then sequentially executes the program.

A configuration of the motion controller will be described below with reference to FIG. 17. In the program in FIG. 2, in G00, fast feeding for positioning to a position X100.0 is performed at a speed of 10,000 (block 1). In G01, linear interpolation for positioning to a position X300.0 is performed at a speed of 2,000 (block 2).

The program is preliminarily executed under no control with a measurement signal for time measurement turned on. Then, the following are measured: the execution time Tbr_i (i: block number) of each of the blocks (that is, a block i) included in the program and the execution time Tpr of the entire program (hereinafter referred to as the "actually measured program execution time"). When the results of the measurement are saved to an internal data area, re-measurement is unnecessary unless the program is changed. FIG. 3 shows the relation between the execution time Tbr_i of each block and the actually measured program execution time Tpr. In FIG. 3, the program includes a block with number 1 and a block with number 2.

Furthermore, parameters are provided which set a predicted time (that is, an in-position predicted time Tinp) immediately after completion of a pulse output for the block with number i until an in-position state is established. Moreover, a parameter is provided which sets the execution time Tps of the desired entire program (hereinafter referred to as the "specified program execution time").

Then, based on the ratio between the actually measured program execution time Tpr and the specified program execution time Tps, the execution time Tbs_i of each block (block i) elapsed when the program is executed in the specified program execution time Tps is calculated in accordance with Formula (1) (i is a program block number).

$$Tbs\_i = Tbr\_i \times Tps/Tpr \tag{1}$$

Figure 4:
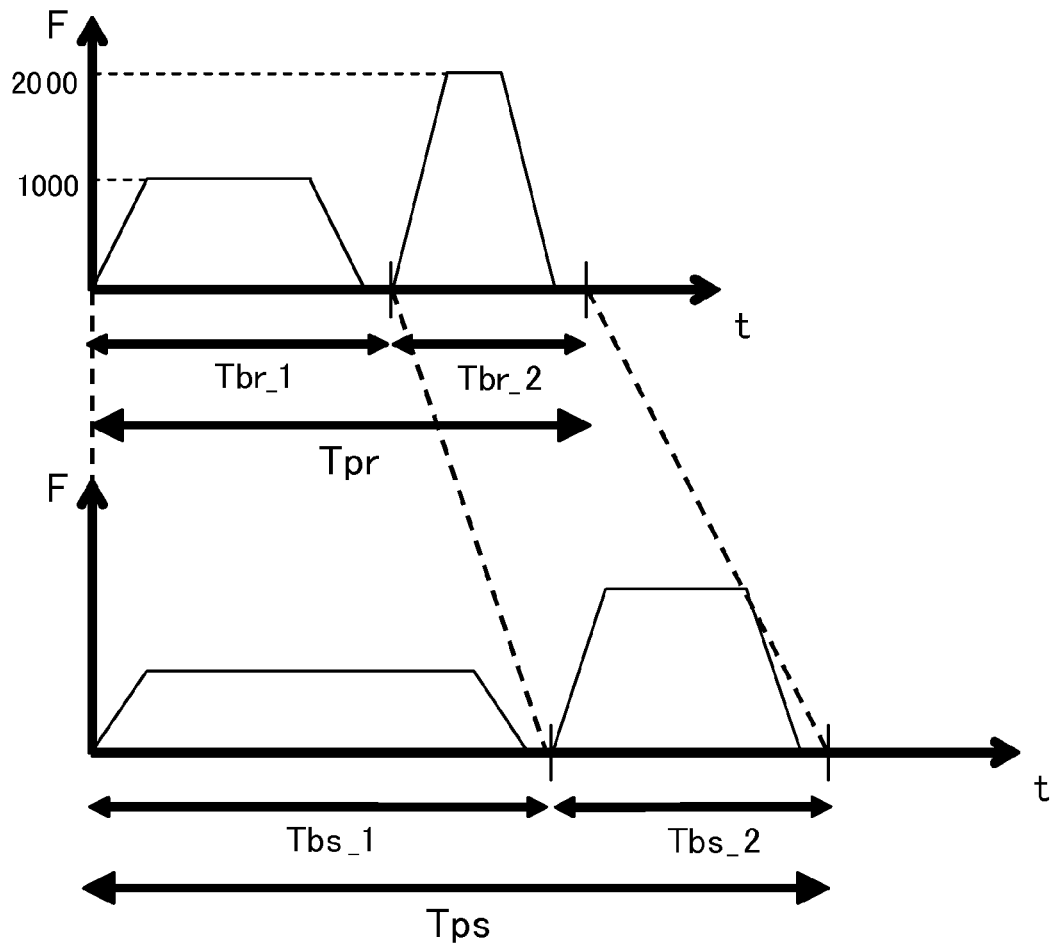
FIG. 4 is a diagram illustrating the relations among the actually measured program execution time Tpr, an actually measured block execution time Tbr_i, a desired program execution time Tps, and a block execution time Tbs_i elapsed when the program is executed in the desired program execution time Tps.

FIG. 4 shows the relations among the actually measured program execution time Tpr, the actually measured block execution time Tbr_i, a program execution time Tps specified using a parameter, and the execution time Tbs_i of each block calculated in accordance with Equation (1). FIG. 4 shows a case where the block number i is 1 and 2 (i=1 and 2).

Based on the calculated execution time Tbs_i of each block (block i), a moving distance L_i, an acceleration and deceleration time constant Tcon_i, and the set in-position predicted time Tinp, a moving speed Fs_i for each block achieved when the program is executed in the specified program execution time Tps is calculated in accordance with Formula (2). Formula (2) corresponds to a case of time fixed acceleration and deceleration. Furthermore, the moving distance L_i is data specified in a machining program. The acceleration and deceleration time constant Tcon_i is data pre-specified using a parameter.

$$Fs\_i = L\_i / (Tbs\_i - Tcon\_i - Tinp) \tag{2}$$

Figure 5:
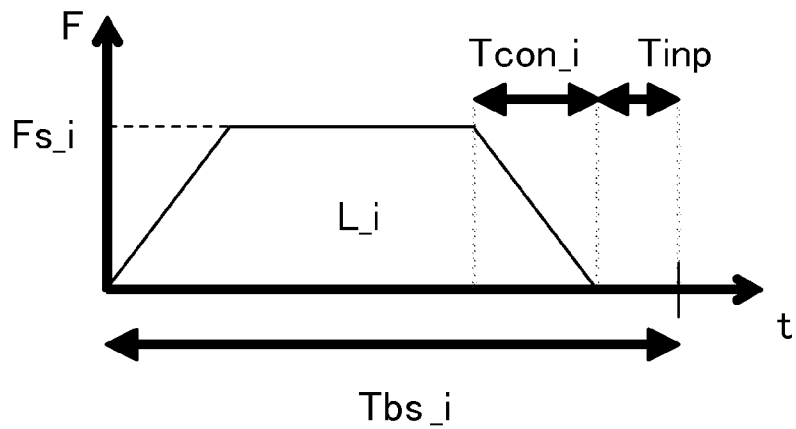
FIG. 5 is a diagram illustrating the relations among the block execution time Tbs_i elapsed when the program is executed in the desired time, a moving distance L_i, an acceleration and deceleration time constant Tcon_i, an in-position predicted time Tinp, and a moving speed Fs_i.

FIG. 5 shows, in the machining program block i, the relations among the execution time Tbs_i of each block, the moving distance L_i, the acceleration and deceleration time constant Tcon_i, the in-position predicted time Tinp, and the moving speed Fs_i calculated in accordance with Formula (2).

The execution time of the entire program can be set equal to the specified program execution time Tps by executing, after the above-described process is carried out, the program with a specified speed for each block of the program substituted with the calculated moving speed Fs_i.

For Formula (2), the execution time of the entire program may also be set equal to the specified program execution time Tps by determining the acceleration and deceleration time constant Tcon_i instead of the moving speed Fs_i and executing the program with the acceleration and deceleration time constant for each block substituted with the calculated value.

Figure 9:
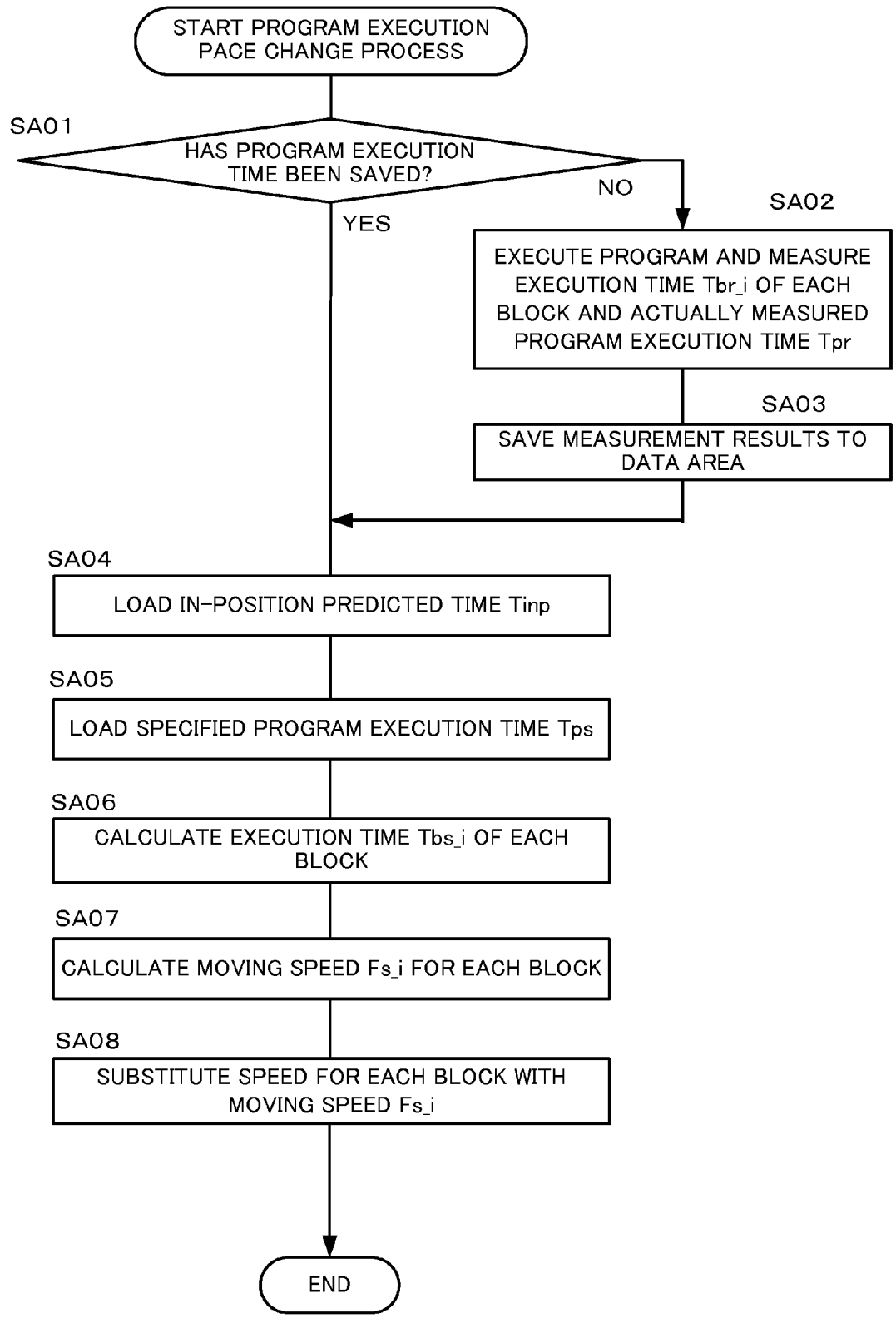
FIG. 9 is a flowchart illustrating a process executed by Embodiment 1 of the motion controller according to the present invention.

FIG. 9 is a flowchart illustrating a process executed by Embodiment 1 of the motion controller. The process will be described in accordance with steps. The in-position predicted time Tinp and the specified program execution time Tps are preliminarily set and stored in the memory.

[Step SA01] It is determined whether or not the program execution time has been saved. If the program execution time has been saved (YES), the process proceeds to step SA04. If the program execution time has not been saved (NO), the process proceeds to step SA02.

[Step SA02] The program is executed, and the execution time Tbr_i of each of the blocks providing the program and the actually measured program execution time Tpr are measured.

[Step SA03] The measurement results are saved to a data area, and the process proceeds to step SA04.

[Step SA04] The in-position predicted time Tinp is loaded.

[Step SA05] The specified program execution time Tps is loaded.

[Step SA06] The execution time Tbs_i of each block is calculated in accordance with Formula (1).

[Step SA07] The moving speed Fs_i for each block is calculated in accordance with Formula (2).

[Step SA08] The moving speed for each block is substituted with the moving speed Fs_i calculated in step SA07, and the process is ended.

Embodiment 2

In some programs, the time needed to establish the in-position state may vary among the blocks. In this case, the use of the method according to Embodiment 1 needs parameters that set the time needed to establish the in-position state as many as the blocks have. Thus, the amount of time and effort needed to set the time needed to establish the in-position state increases consistently with the number of block.

Thus, Embodiment 2 actually measures the time needed to establish the in-position state instead of presetting the amount of time using the appropriate parameter.

First, as is the case with Embodiment 1, the program is preliminarily executed under no control with the measurement signal for time measurement turned on. Then, the following are measured: the execution time Tbr_i (i: block number) of each of the blocks included in the program and the actually measured program execution time Tpr of the entire program. At this time, the following is also measured: the time immediately after completion of a pulse output for each block until the in-position state is established, that is, the in-position time Tinp_i. When, like the actually measured execution time Tbr_i of each block and the actually measured program execution time Tpr, the actually measured in-position time Tinp_i is saved to the internal data area, re-measurement is unnecessary unless the program is changed.

Then, with an actually measured value for each block (that is, in-position time Tinp_i) instead of a parameter set value (that is, in-position predicted time Tinp), the moving speed Fs_i for each block achieved when the program is executed in a specified execution time (that is, specified program execution time Tps) is determined in accordance with Formula (3).

$$Fs\_i = L\_i / (Tbs\_i - Tcon\_i - Tinp\_i) \quad (3)$$

The execution time of the entire program can be set equal to the specified program execution time Tps, the desired time, by executing, after the above-described process is carried out, the program with the specified speed for each block substituted with the moving speed Fs_i.

Figure 10:
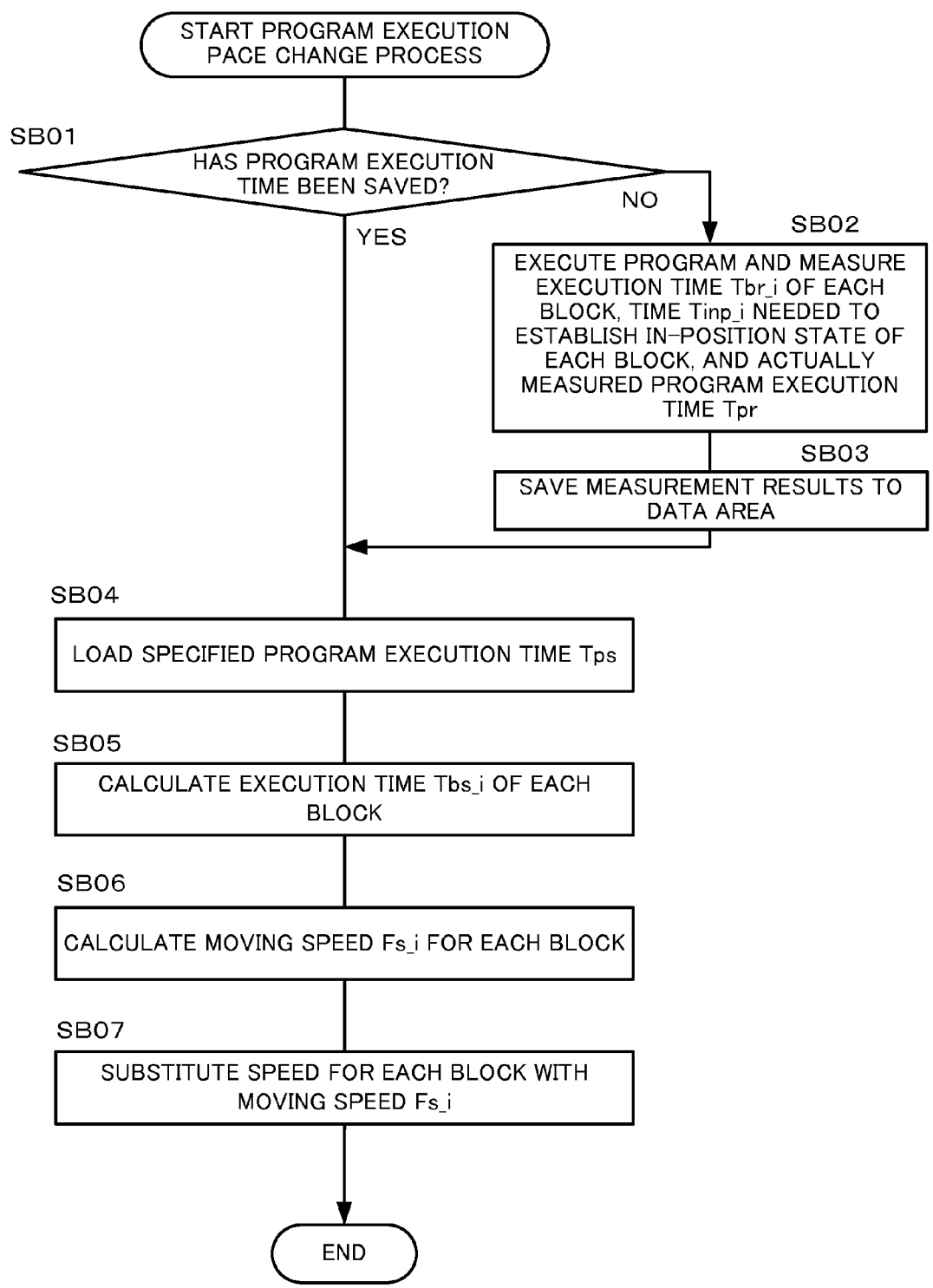
FIG. 10 is a flowchart illustrating a process executed by Embodiment 2 of the motion controller according to the present invention.

FIG. 10 is a flowchart illustrating a process executed by Embodiment 2 of the motion controller. The process will be described in accordance with steps. The in-position predicted time Tinp and the specified program execution time Tps are preliminarily set and stored in the memory.

[Step SB01] It is determined whether or not the program execution time has been saved. If the program execution time has been saved (YES), the process proceeds to step SB04. If the program execution time has not been saved (NO), the process proceeds to step SB02.

[Step SB02] The program is executed, and the following are measured: the actually measured execution time Tbr_i of each of the blocks providing the program, the time Tinp_i needed to establish the in-position state in each block, and the actually measured program execution time Tpr of the entire program.

[Step SB03] The measurement results are saved to the data area, and the process proceeds to step SB04.

[Step SB04] The specified program execution time Tps is loaded.

[Step SA05] The execution time Tbs_i of each block is calculated in accordance with Formula (1).

[Step SB06] The moving speed Fs_i for each block is calculated in accordance with Formula (3).

[Step SB07] The moving speed for each block is substituted with the moving speed Fs_i calculated in step SB06, and the process is ended.

Embodiment 3

The program for the motion controller may include an auxiliary function in order to operate an external apparatus in the middle of the program. In a block with the auxiliary function, the next block is executed when the external apparatus completes operation. The time needed to complete the operation is generally constant in spite of a change in overriding. The methods according to Embodiment 1 and Embodiment 2 fail to deal with a program with an auxiliary function. Thus, the following method is added.

Figures 6, 7:
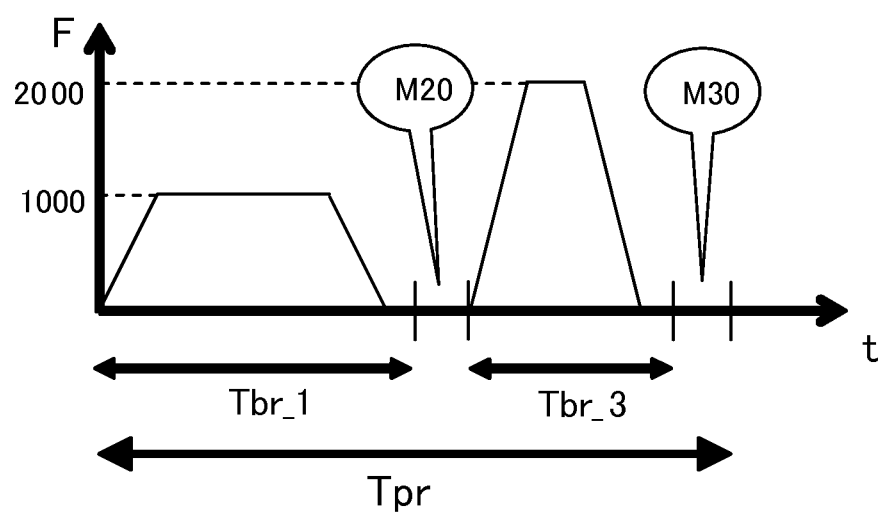
FIG. 6 is a diagram of an example of a program illustrating Embodiment 3 of the motion controller according to the present invention.
FIG. 7 is a diagram illustrating the relation between a movement command block execution time Tbr_i and the program execution time Tpr.

By way of example, a motion controller will be described which stores and sequentially executes a program shown in FIG. 6. In the program in FIG. 6, in G00, fast feeding for positioning to a position X100.0 is performed at a speed of 10,000 (block 1). In M20, a peripheral device is operated (block 2). In G01, linear interpolation for positioning to a position X300.0 is performed at a speed of 2,000 (block 3). M30 indicates a program end (block 4).

First, as is the case with Embodiment 1, the program is preliminarily executed under no control with a measurement signal for time measurement turned on. Then, the following are measured: the execution time Tbr_i (i: block number) of each of movement command blocks included in the program and the execution time Tpr of the entire program. FIG. 7 shows the relation between the actually measured block execution time Tbr_i and the actually measured program execution time Tpr.

Furthermore, parameters are provided which set the predicted time (in-position predicted time Tinp) immediately after completion of a pulse output for the block i until the in-position state is established and the predicted execution time Taux_xx of each auxiliary function (Mxx).

Moreover, a parameter is provided which sets the specified program execution time Tps. The total of the execution times of the auxiliary functions (Taux) included in the program is determined in accordance with Formula (4).

$$Taux = \Sigma Taux\_i \quad (4)$$

The total of the execution times of the blocks with the movement commands is determined in order to set only blocks with movement commands to be targets for a change in execution pace. The total of the execution times is Tpr−Taux in case where the program is executed under no control and is Tps−Taux in case where the program is executed in a specified execution time.

Based on the ratio of these times, the execution time Tbs_i of each movement command block elapsed when the program is executed in the specified program execution time Tps is calculated in accordance with Formula (5).

$$Tbs\_i = Tbr\_i \times (Tps - Taux)/(Tpr - Taux) \quad (5)$$

Figure 8:
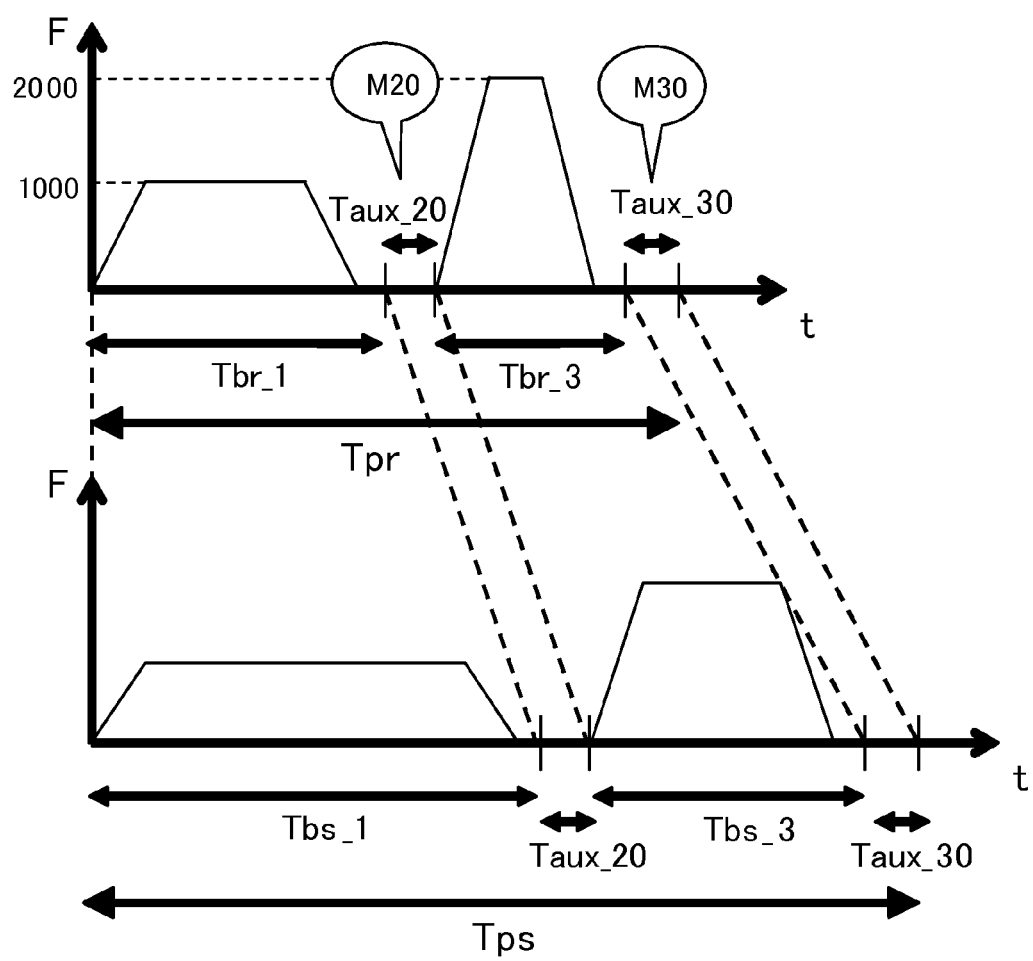
FIG. 8 is a diagram illustrating the relations among the actually measured program execution time Tpr, the actually measured movement command block execution time Tbr_i, the desired program execution time Tps, an auxiliary function predicted execution time Taux_xx, and the block execution time Tbs_i elapsed when the program is executed in the desired program execution time Tps.

FIG. 8 shows the relations between the actually measured program execution time Tpr, the actually measured execution time Tbr_i of each block, the parameter specified program execution time Tps, the predicted execution time Taux_xx of each auxiliary function, and the execution time Tbs_i of each block calculated in accordance with Formula (5).

Subsequently, as is the case with Embodiment 1, the execution time of the entire program can be set equal to the desired specified program execution time Tps by determining the moving speed Fs_i of each block, and then executing the program with the specified speed for each block substituted with the moving speed Fs_i.

Figure 11:
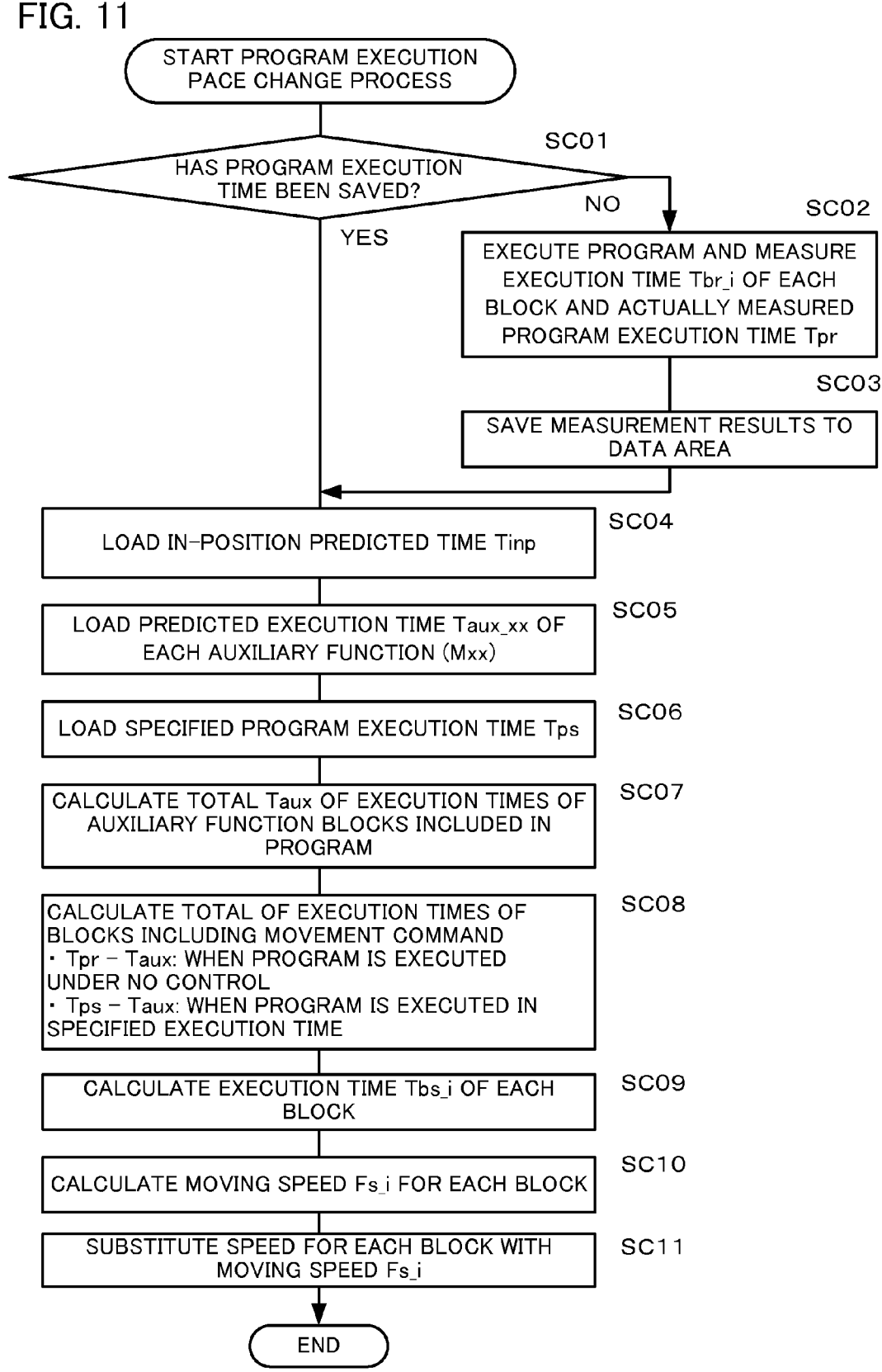
FIG. 11 is a flowchart illustrating a process executed by Embodiment 3 of the motion controller according to the present invention.

FIG. 11 is a flowchart illustrating a process executed by Embodiment 3 of the motion controller. The process will be described in accordance with steps.

[Step SC01] It is determined whether or not the program execution time has been saved. If the program execution time has been saved (YES), the process proceeds to step SC04. If the program execution time has not been saved (NO), the process proceeds to step SC02.

[Step SC02] The program is executed, and the actually measured execution time Tbr_i of each of the blocks providing the program and the actually measured program execution time Tpr are measured.

[Step SC03] The measurement results are saved to the data area, and the process proceeds to step SC04.

[Step SC04] The in-position predicted time Tinp needed to establish the in-position state is loaded.

[Step SC05] The predicted execution time Taux_xx of each auxiliary function (Mxx) is loaded.

[Step SC06] The specified program execution time Tps, the desired execution time of the entire program, is loaded.

[Step SC07] The total Taux of the execution times of the auxiliary function blocks included in the program is calculated.

[Step SC08] The total of the execution times of movement command blocks is calculated. The calculated total value is Tpr−Taux when the program is executed under no control and is Tps−Taux when the program is executed in a specified execution time.

[Step SC09] The execution time Tbs_i of each block with the movement command is calculated in accordance with Formula (5).

[Step SC10] The moving speed Fs_i for each block is calculated in accordance with Formula (2).

[Step SC11] The specified speed for each block is substituted with the moving speed Fs_i calculated in step SC10. The process is then ended.

Embodiment 4

The method according to Embodiment 3 needs to set a parameter for each auxiliary function (Mxx). Consequently, the amount of time and effort needed for the setting increases consistently with the number of external apparatuses.

Thus, Embodiment 4 adopts a method of actually measuring the execution time of the auxiliary function instead of setting the execution time using the appropriate parameter. First, as is the case with Embodiment 3, the program is preliminarily executed under no control with the measurement signal for time measurement turned on, and the execution time Tbr_i (i: block number) of each of the blocks included in the program and the actually measured program execution time Tpr are measured. At this time, the execution time Taux_i of each block for which a command to provide the auxiliary function has been given is also measured.

Then, the actually measured execution times Taux_i of the auxiliary functions for the blocks are summed to determine the total Taux of the execution times of the auxiliary function blocks included in the program. Like the actually measured block execution time Tbr_i and the actually measured program execution time Tpr, when the total Taux of the execution times of the auxiliary function blocks is saved to the internal data area, re-measurement of the total Taux is unnecessary unless the program is changed. In subsequent operations, an operation similar to that in Embodiment 3 is performed to set the execution time of the entire program equal to the desired time Tps.

Figure 12:
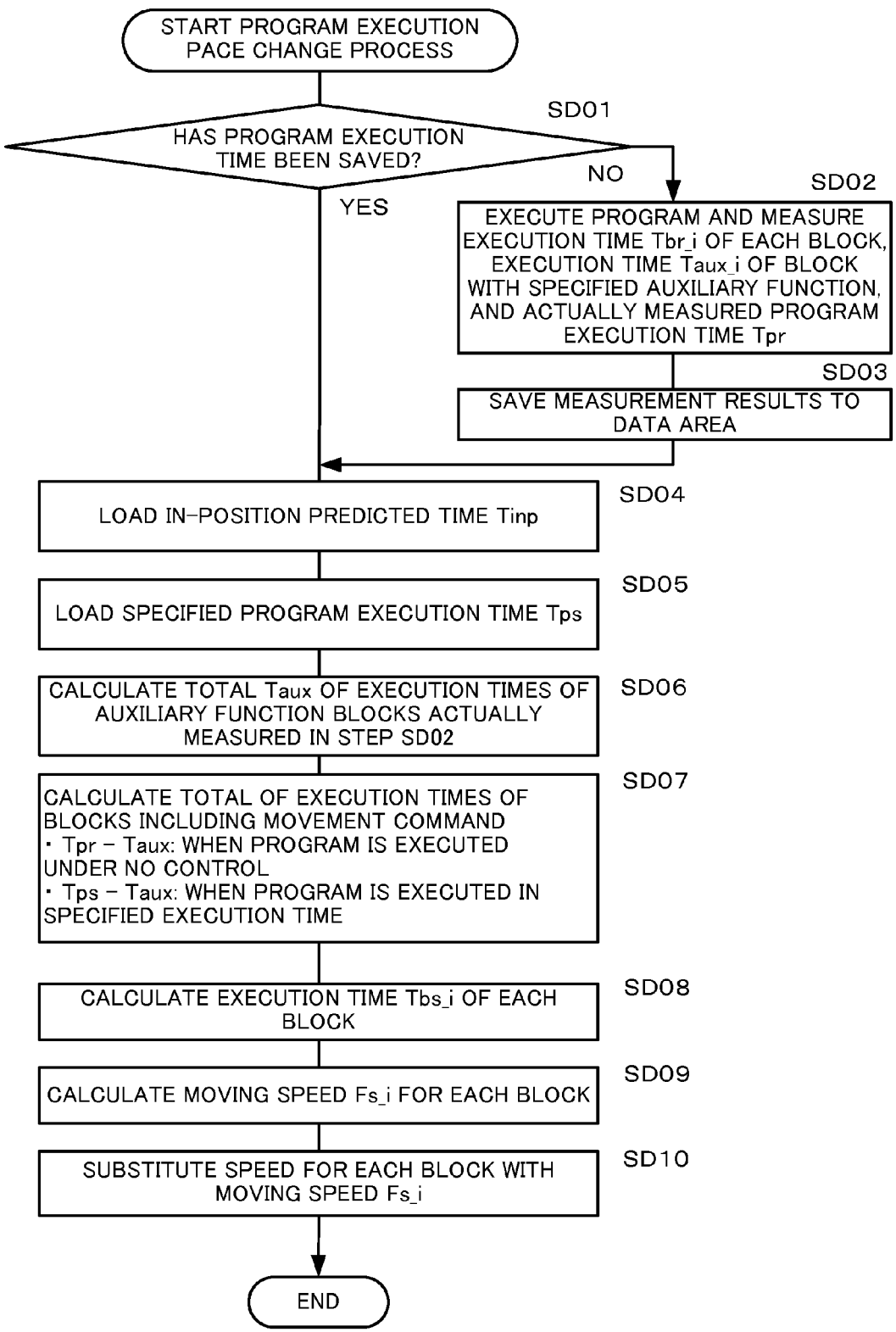
FIG. 12 is a flowchart illustrating a process executed by Embodiment 4 of the motion controller according to the present invention.

FIG. 12 is a flowchart illustrating a process executed by Embodiment 4 of the motion controller. The process will be described in accordance with steps. The in-position predicted time Tinp and the specified program execution time Tps are preliminarily set and stored in the memory.

[Step SD01] It is determined whether or not the program execution time has been saved. If the program execution time has been saved (YES), the process proceeds to step SD04. If the program execution time has not been saved (NO), the process proceeds to step SD02.

[Step SD02] The program is executed, and the following are measured: the actually measured execution time Tbr_i of each of the blocks providing the program, the execution time Taux_i of the auxiliary function (that is, execution time of the block for which a command to provide the auxiliary function has been given), and the actually measured program execution time Tpr (that is, execution time of the entire program).

[Step SD03] The measurement results are saved to the data area, and the process proceeds to step SD04.

[Step SD04] The in-position predicted time Tinp until the in-position state is established is loaded.

[Step SD05] The specified program execution time Tps, the desired execution time of the entire program, is loaded.

[Step SD06] The total Taux of the execution times of the auxiliary function blocks included in the program is calculated.

[Step SD07] The total of the execution times of movement command blocks is calculated. The calculated total value is Tpr−Taux when the program is executed under no control and is Tps−Taux when the program is executed in a specified execution time.

[Step SD08] The execution time Tbs_i of each block with the movement command is calculated in accordance with Formula (5).
[Step SD09] The moving speed Fs_i for each block is calculated in accordance with Formula (2).
[Step SD10] The specified speed for each block is substituted with the moving speed Fs_i calculated in step SD09. The process is then ended.

Embodiment 5

The method according to Embodiment 1 needs to actually measure the execution time and thus needs much time and effort. Thus, Embodiment 5 uses a method of determining the execution time of the program by analyzing the program based on simulation instead of actually measuring the execution time. In Embodiment 5, the execution time Tbr_i of each block and the actually measured program execution time Tpr according to Embodiment 1 are substituted with values determined using the method according to Embodiment 5.

First, for each of the blocks included in the program, based on the moving distance L_i, a specified speed F_i, the acceleration and deceleration time constant Tcon_i, and the in-position predicted time Tinp set using the appropriate parameter, the execution time Tbr_i (i: block number) of each block is calculated in accordance with Formula (6). Formula (6) corresponds to a case of time fixed acceleration and deceleration.

$$Tbr\_i = L\_i/Fs\_i + Tcon\_i + Tinp \quad (6)$$

Then, the execution times Tbr_i of the blocks are summed to determine the actually measured program execution time Tpr. An operation similar to the corresponding subsequent operation in Embodiment 1 is then performed to set the execution time of the entire program equal to the specified program execution time Tps (desired time).

Figure 13:
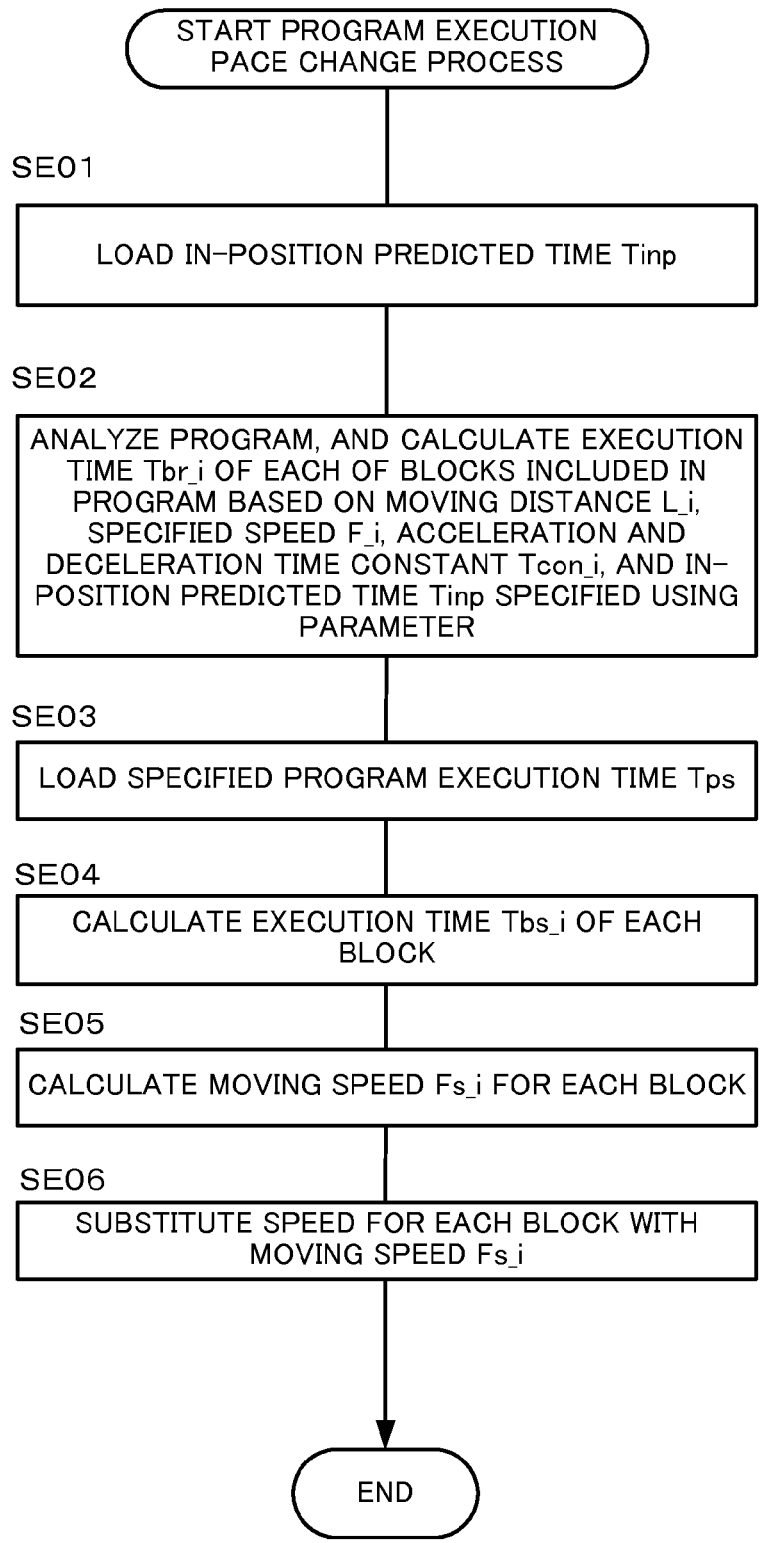
FIG. 13 is a flowchart illustrating a process executed by Embodiment 5 of the motion controller according to the present invention.

FIG. 13 is a flowchart illustrating a process executed by Embodiment 5 of the motion controller. The process will be described in accordance with steps. The in-position predicted time and the specified program execution time Tps are preliminarily set.
[Step SE01] The in-position predicted time is loaded.
[Step SE02] The program is analyzed, and for each of the blocks included in the program, the actually measured block execution time Tbr_i is calculated based on the moving distance L_i, the specified speed F_i, the acceleration and deceleration time constant Tcon_i, and the in-position predicted time Tinp set using the appropriate parameter. And the process proceeds to step S03.
[Step SE03] The specified program execution time Tps is loaded.
[Step SE04] The execution time Tbs_i of each block is calculated in accordance with Formula (1).
[Step SE05] The moving speed Fs_i for each block is calculated in accordance with Formula (2).
[Step SE06] The specified speed for each block is substituted with the moving speed Fs_i calculated in step SE05. The process is then ended.

Embodiment 6

In a case where the execution pace of the system as a whole is changed at the same rate, the ratio of the execution pace may need to be specified, instead of specifying execution time for each of the apparatuses in the system. To achieve this, Embodiment 6 additionally has the following technique.

First, as is the case with Embodiment 1, the program is preliminarily executed under no control with the measurement signal for time measurement turned on, and the execution time Tbr_i (i: block number) of each of the blocks included in the program and the actually measured program execution time Tpr are measured. Subsequently, the ratio r of the execution pace of the program is specified using an appropriate signal, and Tps' is calculated in accordance with Formula (7).

$$Tps' = Tpr \times r \quad (7)$$

In subsequent operations, by implementing an operation similar to that according to Embodiment 1, with Tps according to Embodiment 1 being substituted with Tps', it is possible to set the execution pace of the entire program to be equal to the desired ratio r. In other words, Formula (1) is substituted with Formula (8), and Formula (2) is substituted with Formula (9).

$$Tbs\_i' = Tbr\_i \times Tps'/Tpr \quad (8)$$

$$Fs\_i' = L\_i/(Tbs\_i' - Tcon\_i - Tinp) \quad (9)$$

Figure 14:
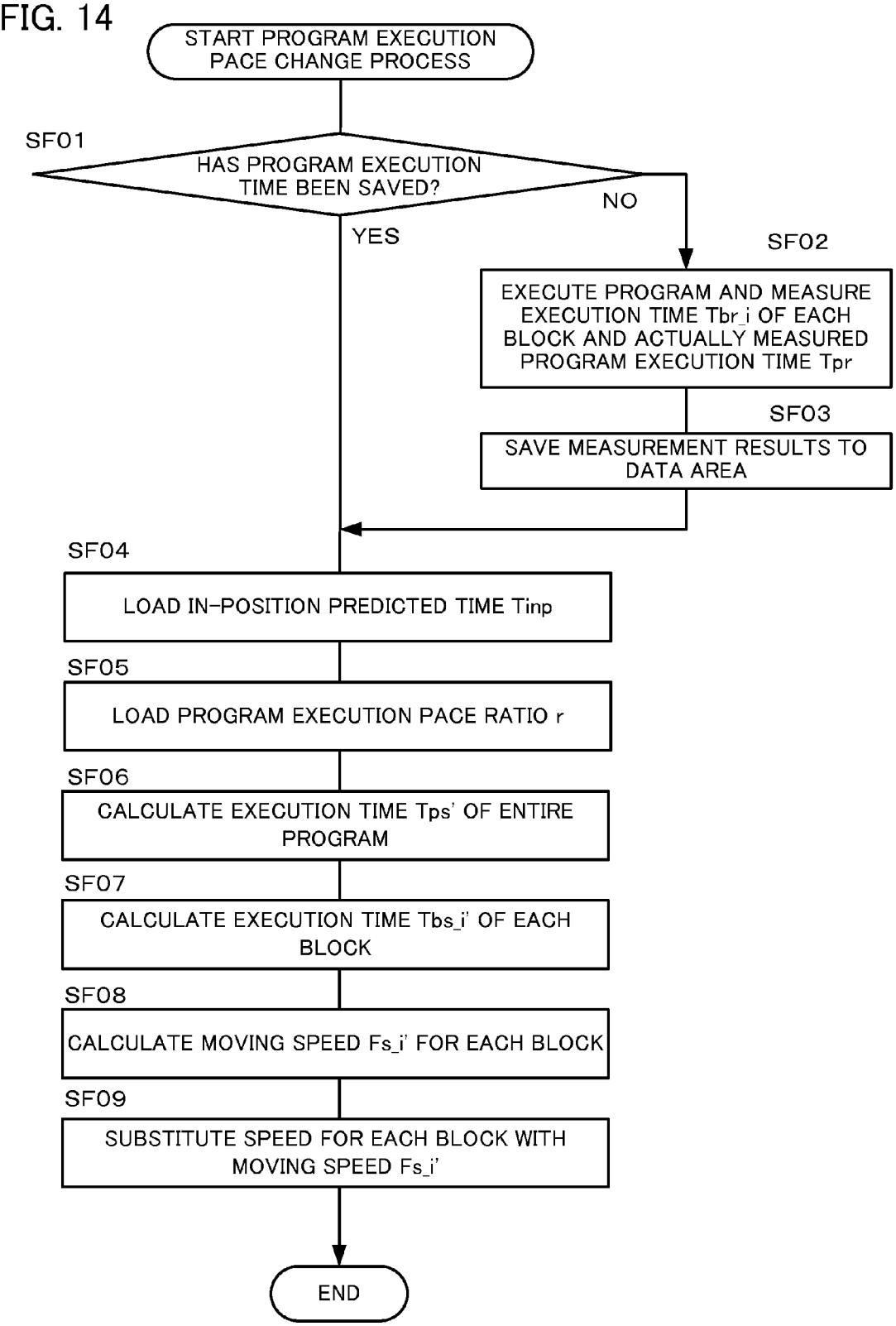
FIG. 14 is a flowchart illustrating a process executed by Embodiment 6 of the motion controller according to the present invention.

FIG. 14 is a flowchart illustrating a process executed by Embodiment 6 of the motion controller. The process will be described in accordance with steps. The program execution pace ratio r and the in-position predicted time Tinp are preset.
[Step SF01] It is determined whether or not the program execution time has been saved. If the program execution time has been saved (YES), the process proceeds to step SF04. If the program execution time has not been saved (NO), the process proceeds to step SF02.
[Step SF02] The program is executed, and the actually measured execution time Tbr_i of each of the blocks providing the program and the actually measured program execution time Tpr are measured.
[Step SF03] The measurement results are saved to the data area, and the process proceeds to step SF04.
[Step SF04] The in-position predicted time Tinp is loaded.
[Step SF05] The program execution pace ratio r is loaded.
[Step SF06] The program execution time Tps' is calculated in accordance with Formula (7).
[Step SF07] The execution time Tbs_i' of each block is calculated in accordance with Formula (8).
[Step SF08] The moving speed Fs_i' for each block is calculated in accordance with Formula (9).
[Step SF09] The specified speed for each block is substituted with the moving speed Fs_i' calculated in step SF09. The process is then ended.

Embodiment 7

In Embodiment 1, when the desired execution time Tps of the entire program is set equal to the execution time of a specified program, the program can be executed in the same amount of time as that in which the specified program is executed. Embodiment 7 uses this to make the execution time of each of programs conform to the longest execution time of a program, from among those programs, that has such a longest execution time so as to minimize the power consumption without increasing cycle time.

Embodiment 8

The above-described embodiments of the present invention assume that execution of programs under the same conditions constantly results in the same execution time. However, a time needed for positioning may vary due to individual differences among workpieces, secular changes in machines, and the like. In this case, the difference between the specified execution time (specified program execution time Tps) and the actual execution time (actually measured program execution time Tpr) increases consistently with the length of the execution time of the program.

Thus, to solve this problem, Embodiment 8 uses the following method.

First, Embodiment 1 is executed to preliminarily derive the calculated block execution time Tbs_i and calculated moving speed Fs_i (i: block number) of each block. Then, the program is executed with the specified speed for the first block substituted with the derived calculated moving speed Fs_1. For each block, the amount of time Tba_i from the beginning to end of the block is measured. For example, when the ith block ends, the difference between the execution time Tbs_i of the block and the actually needed time Tba_i is determined, and the difference is subtracted from the execution time Tbs_i+1 of the i+1th block (see Formula (10)).

$$Tbs\_i+1'=Tbs\_i+1+(Tba\_i-Tbs\_i) \quad (10)$$

Using Tbs_i+1' obtained in accordance with Formula (10) as the execution time of the block, the moving speed Fs_i+1' of the second block is determined in accordance with Formula (11).

$$Fs\_i'=L\_i/(Tbs\_i'-Tcon\_i-Tinp) \quad (11)$$

The above-described process means that the difference between the pre-calculated execution time of the first block and actually needed execution time is compensated by changing the speed for the second block.

Subsequently, the deviation of the execution time of each block is similarly subtracted from the execution time of the next block to prevent the deviation of the execution time from being accumulated.

Figure 15:
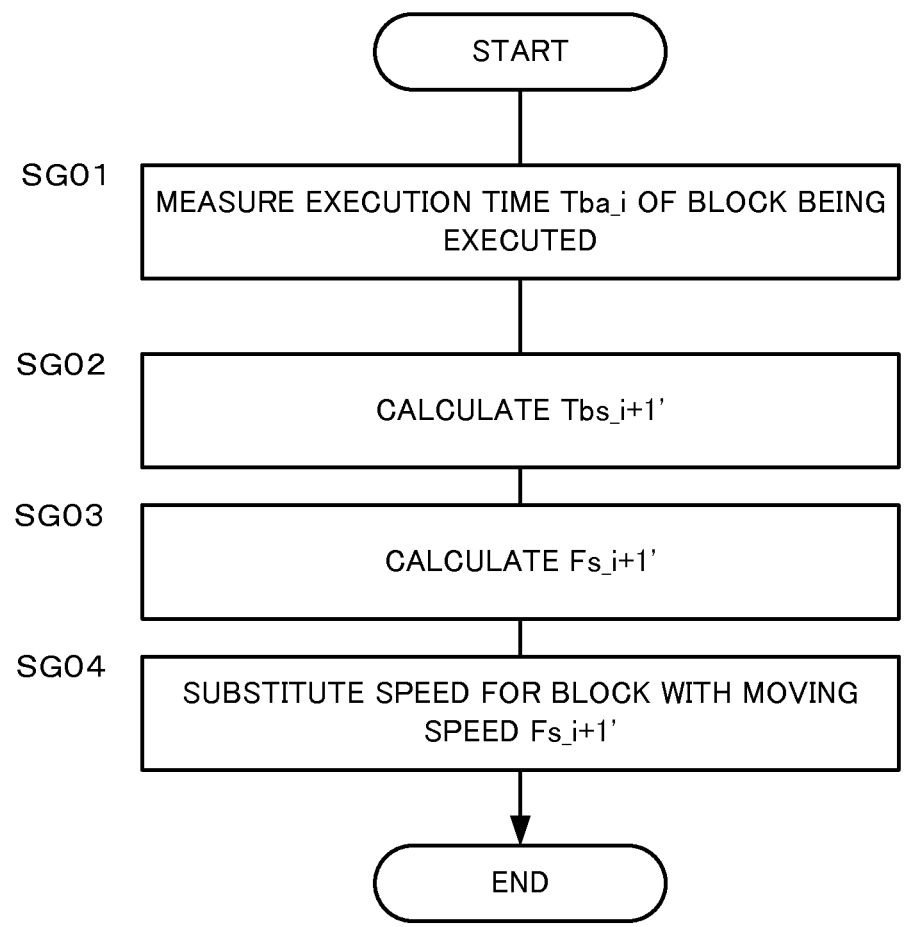
FIG. 15 is a flowchart illustrating a process executed by Embodiment 8 of the motion controller according to the present invention.

FIG. 15 is a flowchart illustrating a process executed by Embodiment 8 of the motion controller. The process will be described in accordance with steps.

[Step SG01] The execution time Tba_i of block being executed is measured.

[Step SG02] When the ith block ends, the difference (=Tba_i−Tbs_i) between the execution time Tbs_i and execution time Tba_i of the block is determined, and the difference is subtracted from the i+1th execution time Tbs_i+1 (that is, Tbs_i+1+(Tba_i−Tbs_i) on the right side of Formula (10) is calculated) to determine Tbs_i+1'.

[Step SG03] Using Tbs_i+1 calculated in step SG02 as the execution time of the block, the i+1th moving speed Fs_i+1' is calculated in accordance with Formula (11).

[Step SG04] The process is ended with the speed for the i+1th block substituted with Fs_i+1'.

Embodiment 9

When the execution time of a program with a mixture of blocks with higher accelerations and blocks with lower accelerations is extended, power consumption can be reduced efficiently by extending the execution times of blocks with higher accelerations in a concentrated manner to reduce the acceleration instead of extending the execution time of each block in a given ratio. Thus, Embodiment 9 additionally uses the following technique. First, the acceleration for each block is determined using the following procedure.

<1> The execution time Tpr of the entire program is actually measured or calculated.

<2> The difference ΔT between the execution time Tps of the entire specified program and the execution time Tpr of the entire program is determined in accordance with Formula (12).

$$\Delta T=Tps-Tpr \quad (12)$$

<3> Of the accelerations A_i (i: block number) of the blocks in the program, the highest acceleration A1 and the second highest acceleration A2 are determined.

<4> For all the blocks with the acceleration A1, the total acceleration and deceleration time Tcon_sum is calculated in accordance with Formula (13) using the specified speed F_i for each block. In this case, the number of a block with the acceleration A1 is denoted by j in Formula (13).

$$Tcon\_sum=\Sigma j(F\_j/A1) \quad (13)$$

<5> The acceleration A, which is achieved by extending the total acceleration and deceleration time Tcon_sum for the blocks in <4> by ΔT, is determined in accordance with Formula (14).

$$A=\Sigma j(F\_j)/(Tcon\_sum+\Delta T) \quad (14)$$

<6> For A≥A2, the acceleration for the block in <4> is updated to A to complete the process of determining the acceleration. On the other hand, for A<A2, the acceleration for the block in <4> is updated to A2, and the total acceleration and deceleration time Tcon_sum' is recalculated in accordance with Formula (15). The process then proceeds to <7>.

$$Tcon\_sum'=\Sigma j(F\_j/A2) \quad (15)$$

<7> ΔT is recalculated (ΔT') in accordance with Formula (16) utilizing the results of <4> and <6> to update the value of ΔT to ΔT'. Then, to further reduce the acceleration below the second highest acceleration A2, the process returns to <3>.

$$\Delta T'=\Delta T-(Tcom\_sum'-Tcon\_sum) \quad (16)$$

After the above-described process is executed, the program is executed with the acceleration for each block substituted with the determined acceleration. Then, the execution time of the entire program is equal to the desired time Tps, and higher accelerations in the program can be reduced in a concentrated manner.

Figure 16:
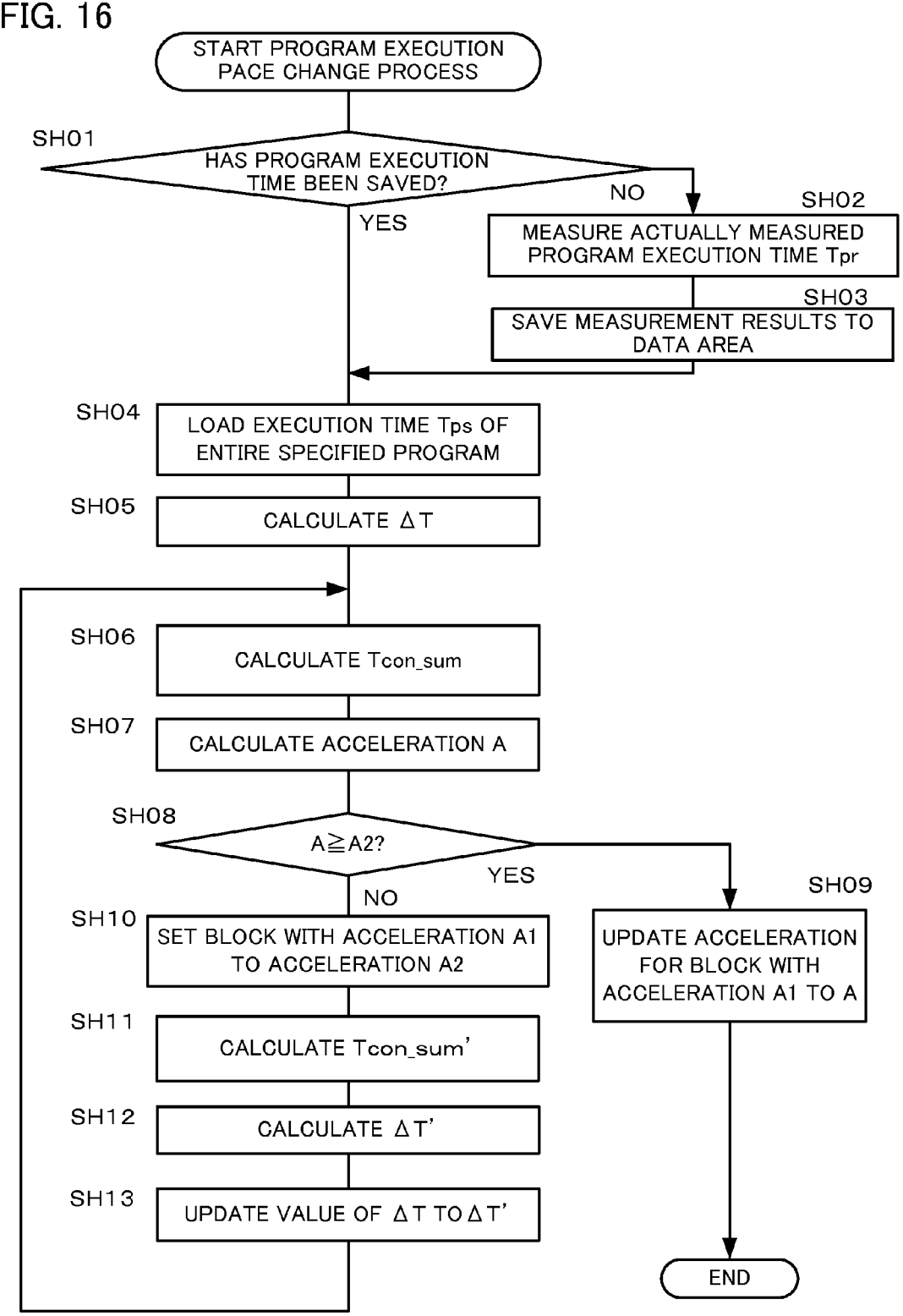
FIG. 16 is a flowchart illustrating a process executed by Embodiment 9 of the motion controller according to the present invention.

FIG. 16 is a flowchart illustrating a process executed by Embodiment 9 of the motion controller. The process will be described in accordance with steps.

[Step SH01] It is determined whether or not the program execution time has been saved. If the program execution time has been saved (YES), the process proceeds to step SH04. If the program execution time has not been saved (NO), the process proceeds to step SH02.

[Step SH02] The program is executed, and the actually measured program execution time Tpr is measured.

[Step SH03] The measurement results are saved to the data area.

[Step SH04] The execution time Tps of the entire specified program is loaded.

[Step SH05] The difference ΔT between the execution time Tps of the entire specified program and the execution time Tpr is calculated in accordance with Formula (12).

[Step SH06] The total acceleration and deceleration time Tcon_sum for the blocks with the acceleration A1 is calculated in accordance with Formula (13) using the specified speed F_j for each block (the acceleration A1 corresponds to the highest acceleration).

[Step SH07] The acceleration A, which is achieved by extending the total acceleration and deceleration time Tcon_sum in step SH06 in <4> by ΔT calculated in step SH05, is determined in accordance with Formula (14).
[Step SH08] It is determined whether or not the acceleration A calculated in step SH07 is equal to or higher than the acceleration A2. If the acceleration A is equal to or higher than the acceleration A2 (YES), the process proceeds to step SH09. If the acceleration A is lower than the acceleration A2 (NO), the process proceeds to step SH10.
[Step SH09] The acceleration for blocks with the acceleration A1 is updated to A, and the process is ended.
[Step SH10] Blocks with the acceleration A1 are set to be blocks with the acceleration A2.
[Step SH11] The total acceleration and deceleration time Tcon_sum' for the acceleration A2 is calculated in accordance with Formula (15).
[Step SH12] ΔT' is calculated in accordance with Formula (16).
[Step SH13] The value of ΔT is updated to ΔT', and the process returns to step SH06.

Figure 17:
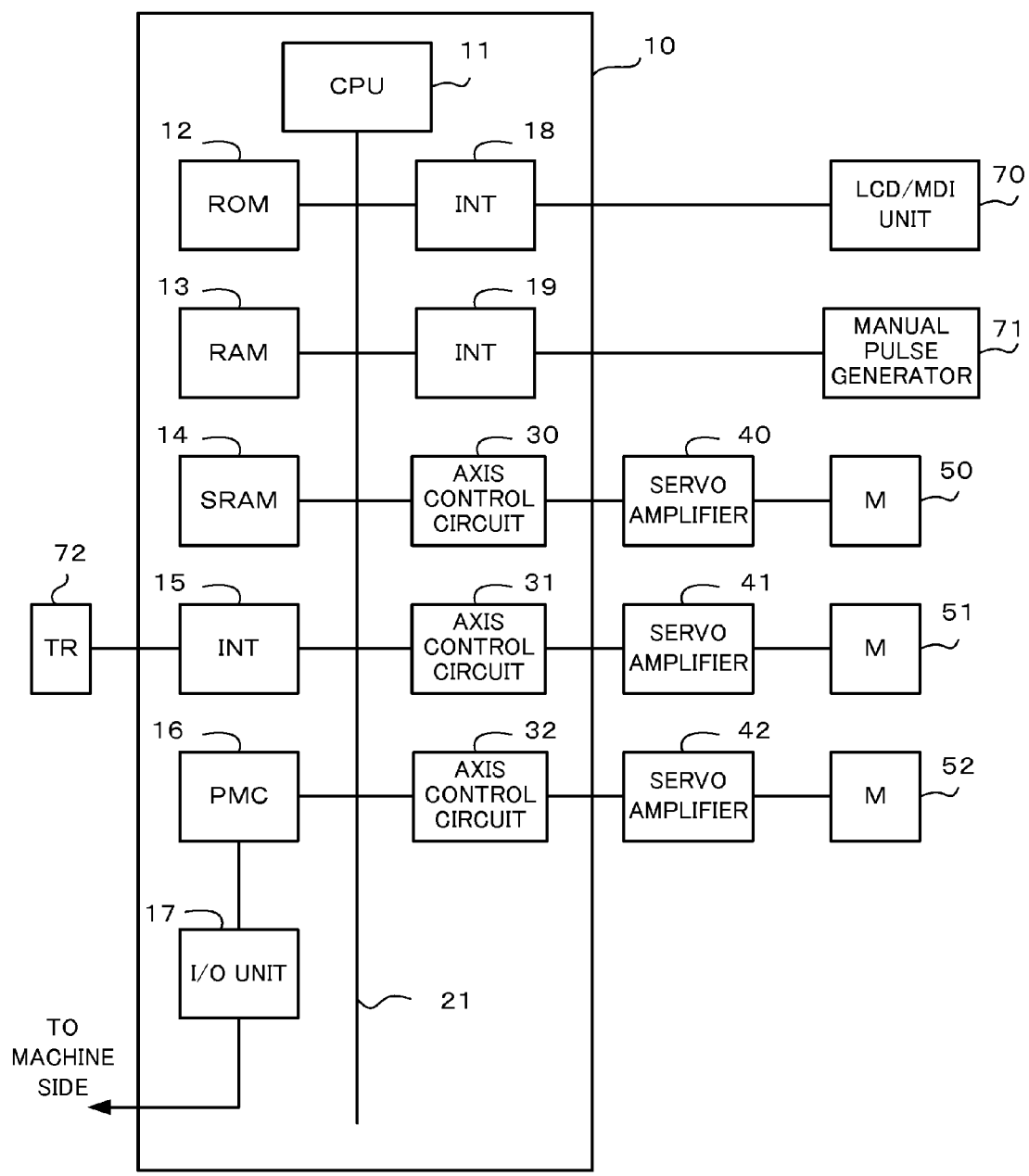
FIG. 17 is a block diagram illustrating the motion controller.

FIG. 17 is a functional block diagram showing an essential part of the motion controller.

A processor (CPU) 11 in a numerical controller 10 is a processor that controls the numerical controller 10 as a whole. The processor 11 reads, via a bus 21, a system program stored in a ROM 12, to control comprehensively the numerical controller 10 in accordance with the system program. A RAM 13 stores, for example, temporary calculation data and display data, and various data input by an operator via a manual data input with a liquid crystal display (LCD/MDI unit) 70.

A SRAM 14 is configured as a nonvolatile memory which is backed up by a battery (not shown in the drawings) and which holds the storage state of the memory even when the numerical controller 10 is powered off. The SRAM 14 stores, for example, a program including the timing program according to the present invention, data needed to carry out the present invention, a machining program described below and loaded via an interface 15, and a machining program input via the LCD/MDI unit 70. Furthermore, the ROM 12 includes a various system programs pre-written thereto and configured to execute a process for an edition mode needed to create and edit a machining program and a process for automatic operation.

The interface 15 is an interface for an external apparatus which can be connected to the numerical controller 10. An external apparatus 72 such as an external storage apparatus is connected to the interface 15. A machining program, a thermal displacement measurement program, and the like are loaded from the external storage apparatus. A PMC (Programmable Machine Controller) 16 controls an auxiliary apparatus and the like on a machine tool side using a sequence program incorporated in the numerical controller 10. That is, the PMC 16 modifies signals needed for the auxiliary apparatus side in the sequence program in accordance with an M function, an S function, and a T function specified in a machining program, and outputs the resultant signals to the auxiliary apparatus side through an I/O unit 17. On account of the signal output, auxiliary apparatuses such as actuators are activated. Moreover, receiving signals sent by operation of switches on a control panel provided on the main body of the machine tool, the PMC 16 implements necessary processing before transmitting the same to the processor 11.

Image signals such as the current position of each shaft of the machine tool, alarms, parameters, and image data are transmitted to the LCD/MDI unit 70 and displayed on a display of the LCD/MDI unit 70. The LCD/MDI unit 70 is a manual data input apparatus including the display and a keyboard. An interface 18 receives data from the keyboard of the LCD/MDI unit 70 and passes the data to the processor 11.

An interface 19 is connected to a manual pulse generator 71. The manual pulse generator 71 is mounted in a control panel of the machine tool and used to precisely position movable portions of the machine tool by controlling respective axes based on manual operation using distributed pulses.

Axis control circuits 30 to 32 for an X axis, a Y axis, and an Z axis, respectively, which move a table T of the machine tool receives movement commands for the axes from the processor 11 and outputs the commands for the axes to servo amplifiers 40 to 42. The servo amplifiers 40 to 42 receive the commands to drive servo motors 50 to 52 for the respective axes. The servo motors 50 to 52 for the respective axes each incorporate a position detector. A position signal from the position detector is fed back as a pulse train.

What is claimed is:

1. A motion controller that sequentially executes a pre-registered program formed of a plurality of blocks, the motion controller comprising:
a block execution time measuring section that actually measures an execution time of each of the blocks constituting the program;
a program execution time specifying section that specifies an execution time of the entire program;
a positioning time setting section that sets a time immediately after a pulse output for the block is completed until an in-position state is established;
a calculation section that calculates a speed or an acceleration and deceleration time constant for each block which allows the program to be executed in the program execution time specified by the program execution time specifying section, on the basis of the execution time of each block actually measured by the block execution time measuring section, the program execution time specified by the program execution time specifying section, and the time needed to establish the in-position state and set by the positioning time setting section; and
an execution section that executes the program in use of the speed or the acceleration and deceleration time constant calculated by the calculation section.

2. The motion controller according to claim 1, further comprising an auxiliary function execution time setting section that sets a time needed to execute an auxiliary function,
wherein the calculation section calculates the speed or the acceleration and deceleration time constant for each block which allows the program to be executed in the specified execution time, by taking into account also the execution time of the auxiliary function set by the auxiliary function execution time setting section.

3. The motion controller according to claim 1, further comprising an auxiliary function execution time measuring section that actually measures a time needed to execute the auxiliary function,
wherein the calculation section calculates the speed or the acceleration and deceleration time constant for each block which allows the program to be executed in the specified execution time by taking into account also the execution time of the auxiliary function actually measured by the auxiliary function execution time measuring section.

4. The motion controller according to claim 1, further comprising:
a block execution time measuring section that actually measures the execution time of each of the blocks constituting the program while the program is being executed; and
a block speed/acceleration and deceleration time constant calculating section that calculates a speed or an acceleration and deceleration time constant for a block to be executed next time on the basis of the block execution time actually measured by the block execution time measuring section,
wherein a target block is executed using the speed or the acceleration and deceleration time constant calculated by the block speed/acceleration and deceleration time constant calculating section, to change an execution pace for the entire program in such a manner that the program satisfies the specified execution time or the execution pace in the specified ratio.

5. The motion controller according to claim 1, further comprising:
a block acceleration analyzing section that analyzes an acceleration of each of the blocks included in the program; and
a speed/acceleration and deceleration time constant calculating section that compares the accelerations of the blocks analyzed by the block acceleration analyzing section to calculate a speed or an acceleration and deceleration time constant in such a manner that the acceleration is reduced for a block with a high acceleration,
wherein the acceleration is reduced, in a concentrated manner, for a high acceleration part of the entire program to be executed, to change an execution pace for the entire program in such a manner that the program satisfies the specified execution time or the execution pace in the specified ratio.

6. A motion controller that sequentially executes a pre-registered program formed of a plurality of blocks;
the motion controller comprising:
a block execution time measuring section that actually measures an execution time of each of the blocks constituting the program;
a program execution time specifying section that specifies an execution time of the entire program;
a positioning time measuring section that actually measures a time immediately after a pulse output for the block is completed until an in-position state is established;
a calculation section that calculates a speed or an acceleration and deceleration time constant for each block which allows the program to be executed in the program execution time specified by the program execution time specifying section, on a basis of the execution time of each block actually measured by the block execution time measuring section, the program execution time specified by the program execution time specifying section, and the time needed to establish the in-position state and actually measured by the positioning time measuring section; and
an execution section that executes the program in use of the speed or the acceleration and deceleration time constant calculated by the calculation section.

7. A motion controller that sequentially executes a pre-registered program formed of a plurality of blocks,
the motion controller comprising:
a block execution time analyzing section that analyzes an execution time of each of the blocks constituting the program;
a program execution time specifying section that specifies an execution time of the entire program;
a positioning time setting section that sets a time immediately after a pulse output for the block is completed until an in-position state is established;
a calculation section that calculates a speed or an acceleration and deceleration time constant for each block which allows the program to be executed in the program execution time specified by the program execution time specifying section, on the basis of the execution time of each block analyzed by the block execution time analyzing section, the program execution time specified by the program execution time specifying section, and the time needed to establish the in-position state and set by the positioning time setting section; and
an execution section that executes the program in use of the speed or the acceleration and deceleration time constant calculated by the calculation section.

8. A motion controller that sequentially executes a pre-registered program formed of a plurality of blocks,
the motion controller comprising:
a block execution time measuring section that actually measures an execution time of each of the blocks constituting the program;
a program execution pace ratio specifying section that specifies a ratio of an execution pace for the entire program;
a positioning time setting section that sets a time immediately after a pulse output for the block is completed until an in-position state is established;
a calculation section that calculates a speed or an acceleration and deceleration time constant for each block which allows the program to be executed at an program execution pace ratio specified by the program execution pace ratio specifying section, on the based of the execution time of each block actually measured by the block execution time measuring section, the program execution pace ratio specified by the program execution pace ratio specifying section, and the time needed to establish the in-position state and set by the positioning time setting section; and
an execution section that executes the program in use of the speed or the acceleration and deceleration time constant calculated by the calculation section.

9. A motion controller that simultaneously executes a plurality of preregistered programs formed of a plurality of blocks respectively,
the motion controller comprising:
a block execution time measuring section that measures an execution time of each of the blocks constituting each of the programs;
a specified program measuring section that actually measures an execution time of the whole of a program specified from among the plurality of programs;
a program execution time specifying section that specifies an execution time of each program;
a positioning time setting section that sets a time immediately after a pulse output for the block is completed until an in-position state is established;
a calculation section that calculates a speed or an acceleration and deceleration time constant for each block which allows each program to be executed in the same program execution time as the execution time of the specified program, on the basis of the execution time of each program specified by the program execution time specifying section, the execution time of the whole of the specified program measured by the specified program measuring section, and the time needed to establish the in-position state and set by the positioning time setting section; and an execution section that simultaneously executes the plurality of programs in use of the speed or the acceleration and deceleration time constant calculated by the calculation section.

\* \* \* \* \*